United States Patent [19]

Lemon

[11] Patent Number: 4,489,626
[45] Date of Patent: Dec. 25, 1984

[54] LUBRICATION SYSTEM FOR A PLANETARY GEAR SYSTEM

[75] Inventor: Robert W. Lemon, Farmington Hills, Mich.

[73] Assignee: Rockwell International Corporation, Pittsburgh, Pa.

[21] Appl. No.: 339,035

[22] Filed: Jan. 13, 1982

[51] Int. Cl.³ ............ F16H 3/44; F01M 9/00; F01M 1/00
[52] U.S. Cl. ............ 74/781 R; 184/6.12; 184/11.3
[58] Field of Search ........ 74/784, 781 R, 750 R, 74/766, 767; 184/11 B, 6.12

[56] References Cited

U.S. PATENT DOCUMENTS

| | | | |
|---|---|---|---|
| 2,318,481 | 5/1943 | Greenlee et al. | 74/781 R |
| 2,518,837 | 8/1950 | Taylor | 184/11 R |
| 2,654,269 | 10/1953 | Wilson | 74/781 R |
| 2,720,120 | 10/1955 | Orr et al. | 74/781 R |
| 2,774,256 | 12/1956 | Banker | 74/781 R |
| 2,791,130 | 5/1957 | Boughner | 74/781 R X |
| 2,861,482 | 11/1958 | Schjolin | 74/781 R |
| 3,296,895 | 1/1967 | Karlsson | 74/781 R |
| 3,426,623 | 2/1969 | Abbott | 74/781 R |
| 4,189,960 | 2/1980 | Holdeman | 74/781 R |

FOREIGN PATENT DOCUMENTS

| | | | |
|---|---|---|---|
| 1580056 | 7/1970 | Fed. Rep. of Germany | 74/781 R |
| 984033 | 2/1965 | United Kingdom | 74/781 R |
| 1378910 | 12/1974 | United Kingdom | 74/781 R |

*Primary Examiner*—Allan D. Herrmann
*Assistant Examiner*—Stephen B. Andrews

[57] ABSTRACT

A lubrication system is for a planetary gear system of the type which includes an input shaft for driving an output shaft through a planetary gear reducer. The system includes an oil pump driven by the input shaft to provide lubricating oil to the input shaft bearings and a first chamber defined by a running seal between a ring gear wheel on the input shaft and the housing. A passage through the ring gear wheel allows lubricating oil to be received from the first chamber to a second chamber which is generally defined by a second annular running seal between the ring gear wheel and the planetary carrier. Passages through the planetary carrier allow delivery of the lubricating oil under pressure from the second chamber to the planetary gears and the sun gear.

8 Claims, 4 Drawing Figures

LUBRICATION SYSTEM FOR A PLANETARY GEAR SYSTEM

BACKGROUND OF THE INVENTION

1. Field of the Invention

This invention relates to an improved lubrication system for a planetary gear system and, more specifically, to providing a more positive means for insuring adequate lubrication to the critical elements thereof.

2. Field of the Invention

Although planetary gear reducers which include means for selecting high speed or low speed operation are quite familiar and have been extensively used in the prior art, there remains a need for insuring that adequate lubrication is provided for the critical elements thereof. U.S. Pat. Nos. 2,791,130; 3,296,895; 3,426,623 and 4,189,960 disclose such planetary gear reducers and, typically, rely on splash lubrication, which is sometimes aided by scoops or baffles, to provide lubrication for the planetary gears and other critical elements.

Generally, other types of power transmitting devices are increasingly being designed to include means for providing lubricating oil under pressure to the critical elements thereof. These systems often include a positive displacement lubrication pump and axial and radial bores in the major shafts thereof to deliver the lubrication oil under pressure to specific areas of concern. However, the general configuration of a planetary gear system in which the planetary gears are mounted outwardly of the main shafts had made such positive provision of lubricating oil more complicated. There remains a need for insuring the same type of positive means for lubrication as exists in other power transmitting devices without relying on expensive and complicated drilling of bores in the shafts and other elements of the gear reducer.

SUMMARY OF THE INVENTION

It is, therefore, an object of this invention to provide an improved lubrication system for a planetary gear system which will insure adequate lubrication to the primary elements thereof.

It is a further object to provide such an improved lubrication system which is reliable, uncomplicated and relatively inexpensive to provide.

These and other objects of the invention are provided in a preferred embodiment thereof including an improved lubrication system for a planetary gear system of the type which includes a housing having an input shaft and an output shaft rotatably mounted therein. A ring gear wheel means is mounted on the input shaft and includes a ring gear. A planetary carrier is rigidly secured to the output shaft and has a plurality of planetary gears mounted thereon and in engaging contact with the ring gear. The sun gear engages the plurality of planetary gears and there is provided means for coupling the sun gear to the housing to cause reduced driving of the output shaft by the input shaft. The improvement includes a lubricating oil sump in the housing and a first oil passage means from the oil sump to an inlet of an oil pump driven by the input shaft. The outlet of the oil pump provides lubricating oil to bearing means for the input shaft. An annular running seal between the planetary carrier and the ring gear wheel means defines with the planetary carrier, the output shaft and the ring gear wheel means a primary oil chamber for receiving the lubricating oil from a second oil passage means from the outlet of the pump to the primary oil chamber. A third oil passage means in the carrier housing provides lubricating oil from the primary oil chamber to the plurality of planetary gears.

DETAILED DESCRIPTION OF THE PREFERRED EMBODIMENT

Figure 1:
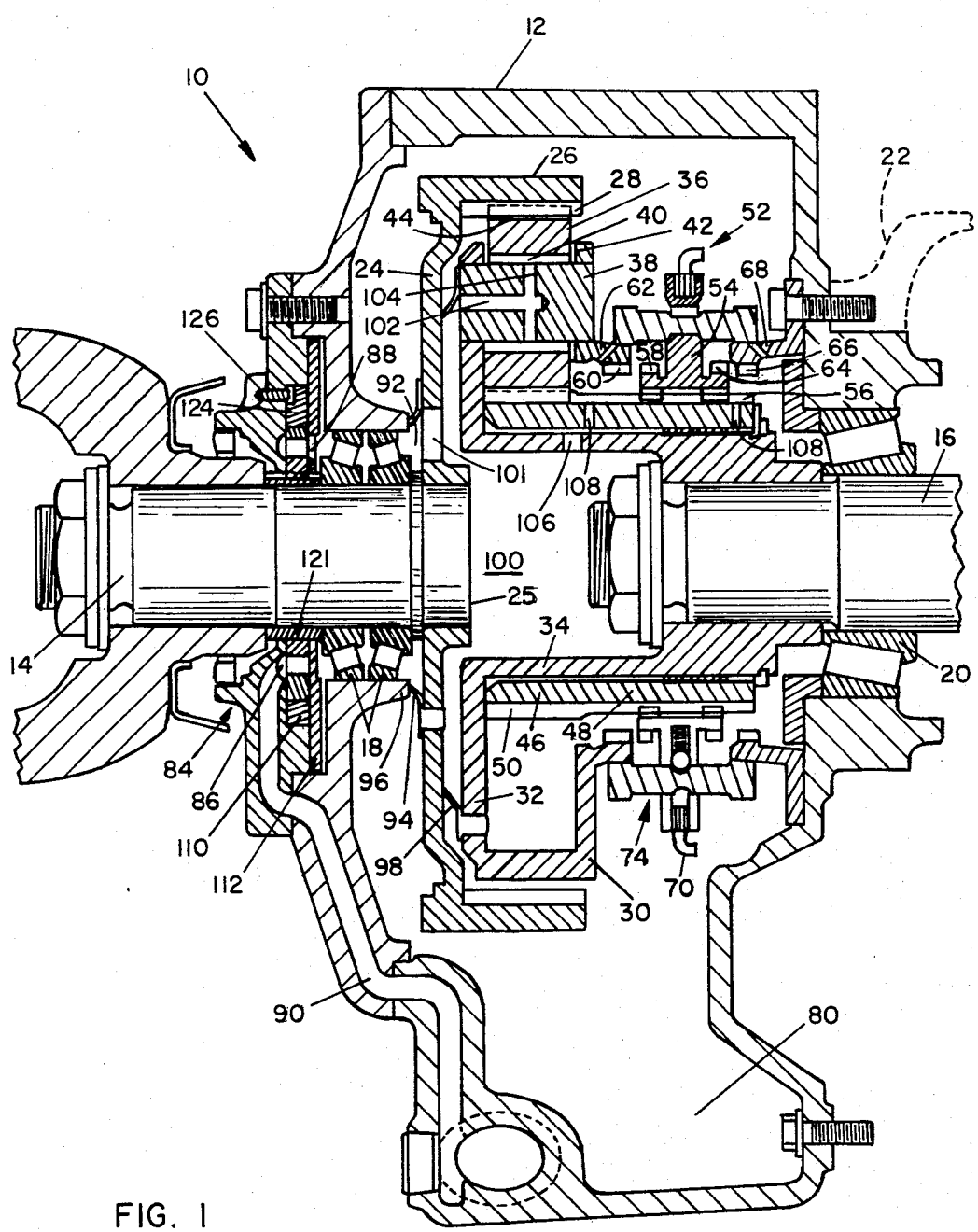
FIG. 1 is a sectional side view of a planetary gear system including the preferred lubrication system therefor.
Figure 2:
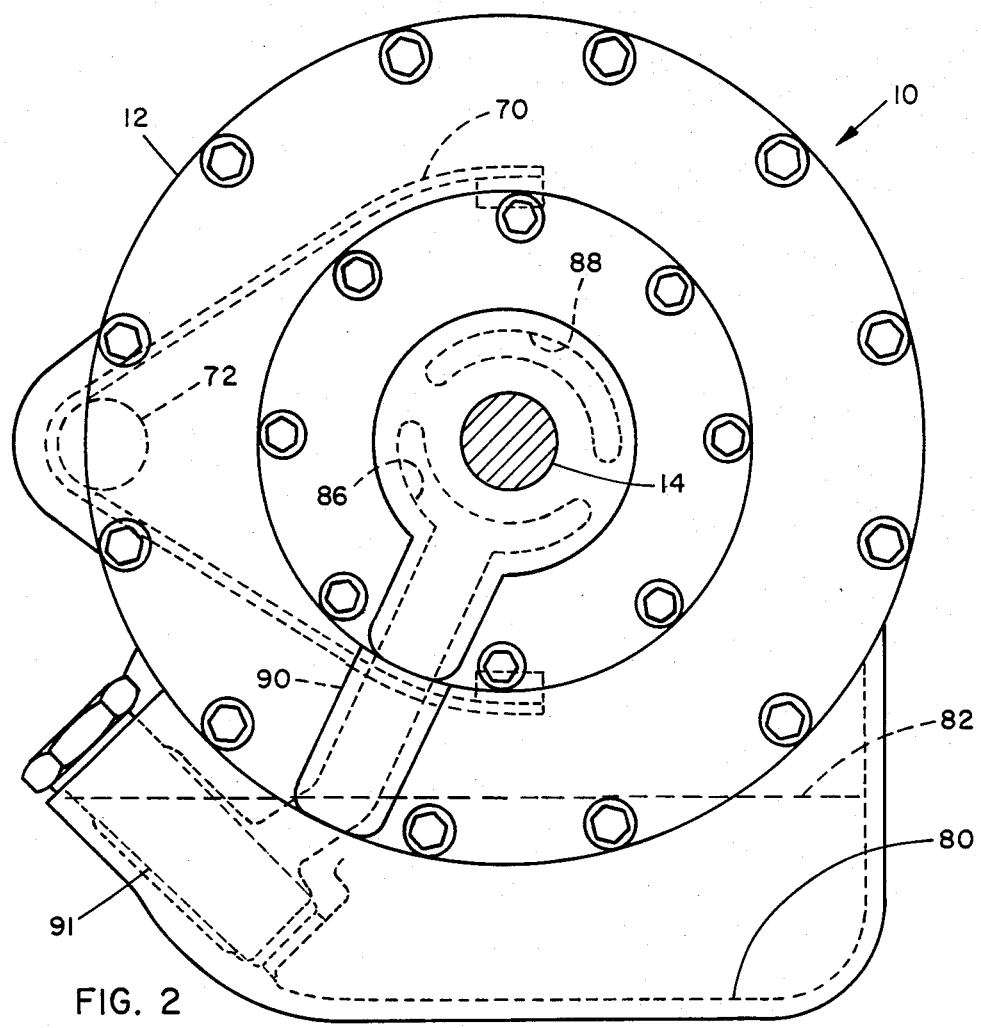
FIG. 2 is an elevational view of the planetary gear system shown in FIG. 1.

As seen in FIGS. 1 and 2, a typical planetary gear reducer 10 includes a housing 12 with an input shaft 14 and an output shaft 16 rotatably mounted therein. The preferred input shaft 14 is supported by a pair of tapered roller bearings 18 and would typically receive power from a vehicle transmission system. The output shaft 16 is shown to be supported by bearings 20 but might otherwise be supported by bearings within another power transmitting device 22 (not shown in detail) to which the planetary gear reducer 10 would normally be mounted. For example, it is not uncommon to use a planetary gear reducer as the input power source for a tandem drive configuration or other type of axle configuration for heavy duty trucks.

The planetary gear reducer 10 further includes a ring gear wheel 24 which is rigidly secured to the inward end 25 of the input shaft 14 and has a ring gear 26 thereon having a plurality of teeth 28. A preferred planetary carrier 30 includes a circular disc portion 32 and a sleeve portion 34 which is rigidly secured to the output shaft 16 to cause it to rotate therewith. Obviously, the carrier 30 might be secured to the output shaft 16 in any number of other manners without the need for a sleeve portion 34 of the type which completely encircles the output shaft 16. A plurality of planetary gears 36 are rotatably mounted on a plurality of pins 38 which are fixedly secured to the planetary carrier 32. Each planetary gear 36 includes a needle bearing 40 for support on the pin 38 and thrust washers 42 at each end thereof. Although other means may be employed to journal the planetary gear 36 to a pin 38, lubrication is necessary to insure smooth, reliable rotation about the pin 38. The teeth 44 of the planetary gear 36 are in meshing engagement with the teeth 28 of the gear ring 26.

A sun gear 46 has a sleeve portion 48 which is in the preferred configuration journaled to and closely received about the sleeve portion 34 of the planetary carrier 30 to allow relative rotation therebetween. If, as mentioned hereinabove, other means were employed to secure the planetary carrier 30 to the output shaft 16, the sun gear 46 might be mounted directly on the output shaft 16 for relative rotation therebetween. In either case, lubricating oil is needed to insure effective, reliable operation as it rotates relative to the planetary carrier and the output shaft. A plurality of teeth 50 of the sun gear 46 are in engaging contact with the teeth 44 of each planetary gear 36.

The preferred planetary gear reducer 10 is designed to function as a dual range planetary gear system. The planetary gear system can be utilized for causing the input shaft to be directly coupled to the output shaft or can alternatively be utilized for reduced driving of the output shaft by the input shaft. For direct driving, the sun gear 46 is coupled to the planetary carrier 22 to prevent rotation of the planetary gears 36 so that rotation of the ring gear 26 will result in identical rotation of the output shaft 16. However, for reduced driving, the sun gear 46 is coupled to the housing 12 to prevent any rotation thereof so that rotation of the ring gear 26 will cause rotation of the planetary gears 36 about the fixed pins 38 in a manner which will reduce the rotational speed of the planetary carrier 30 and thus the output shaft 16.

To accomplish these alternative operating modes, a shift mechanism 52 is utilized to couple the sun gear 46 to either the housing 12 or the planetary carrier 30. The shift mechanism 52 includes an internally toothed annular clutch collar 54 which is slidably mounted on matching extending teeth 56 of the sleeve portion 48 of the sun gear 46. As shown in FIG. 1, the clutch collar 54 is positioned in a neutral position so that neither the direct nor reduced drive is specifically being provided. To couple the clutch collar 54, and thus the sun gear 46, to the planetary carrier 30, the clutch collar 54 must be shifted axially forward toward the planetary carrier 30. An array of outwardly extending teeth 58 on the forward end of the clutch collar 54 must be aligned with and in engaging contact with an array of inwardly extending teeth 60 of a rearwardly extending cylindrical projection 62 of the planetary carrier 32. Similarly, to couple the clutch collar 54, and thus the sun gear 46, with the housing 12, the clutch collar 54 must be shifted axially to the rear away from the planetary carrier 30. Again, an array of outwardly extending teeth 64 at the rearward side of the clutch collar 54 must be aligned with an in engaging contact with an array of inwardly extending teeth 66 on a forwardly extending cylindrical projection 68 of the housing 12. It can be seen that the clutch collar 54 of the shift mechanism 52 is designed to insure that the sun gear 46 can be only coupled to either the housing 12 or the planetary carrier 30 at any one time.

Axial positioning of the clutch collar 54 is accomplished by the axial movement of a yoke 70 which is mounted on and rigidly secured to an axially extending shift rod device 72 which is partially shown in FIG. 2. There are any number of axial shift rod devices and yoke configurations which are well known in the prior art and could be satisfactorily employed in such a planetary gear system. However, for the shift mechanism 52 to properly function to select either direct or reduced drive, it is not sufficient for there to be simply provided linkage and gearing to properly couple the elements in a manner which will transmit torque. It is also desirable to provide means to insure that there is no relative rotation between the elements to be coupled in order for the matching gears to mesh. This is accomplished in the preferred planetary gear reducer 10 by the incorporation of the clutch collar 54 within a synchronizer 74. The synchronizer 74 is designed to produce frictional contact between the clutch collar 54 and the element to which it is to be engaged to reduce any relative rotation therebetween prior to the intended engagement of the matching teeth in the manner described hereinabove. The synchronizer 74 is well known in the prior art and it should be understood that there are any number of means presently existing for insuring that there is little or no relative rotation between members of this type and that any such means could be utilized to insure proper coupling of the elements of a planetary gear reducer.

It should be clear from the manner in which the ring gear wheel 24 is mounted to the input shaft 14 and the planetary gear 30 is mounted to the output shaft 16 that any effort to employ conventional internal oil passages for providing positive lubrication to the planetary gears 36 would be somewhat complicated. Clearly, any system of axial or radical bores through the shafts 14 and 16 and outwardly to the planetary gears 36 would require extensive machining which could significantly add to the overall cost of the planetary gear reducer 10.

Lubricating oil for the preferred lubrication system is stored within the housing 12 in a sump 80 at the lower region thereof. Specifically, as seen in FIG. 2, the lubricating oil would normally be maintained at a level as indicated by the dotted line 82 when the planetary gear reducer 10 is not in operation. Such a predetermined level for the desired quantity of lubricating oil in a power transmitting device is not uncommon for both systems relying on splash lubrication or those employing a pump. An oil pump 84 is coupled to the input shaft 14 to be directly driven thereby and includes an input 86 and an output 88. The preferred oil pump 84 will be discussed hereinbelow, but is should be clear that there are any number of types of pumps which might be utilized without departing from the spirit of the invention as claimed. It is sufficient to know that rotation of the input shaft 14 will cause lubricating oil to be drawn from the oil sump 80 through a first passage 90 to the inlet 86 of the pump 84. The first passage 90 includes a reuseable oil filter 91 to protect the pump 84 from possible damage by foreign matter in the lubricating oil.

Lubricating oil under pressure will then be discharged at the outlet 88 and, in the preferred embodiment, be supplied to the bearings 18 of the input shaft 14. More significantly, the lubricating oil is then provided to an intermediate lubricating oil chamber 92 which is basically defined by the ring gear wheel 24, the input shaft 14 and a first running seal 94 between the ring gear wheel 24 and an annular portion 96 of the housing 12. The first running seal 94 is preferably made of nylon and secured to the ring gear wheel 24 and includes a pliable frusto-conical portion which extends forwardly to make sliding, sealing contact with the annular portion 96. The general flared configuration of the first running seal 94 is such that lubricating oil provided to the intermediate chamber 92 will apply pressure to the seal 94 tending to cause it to continue to maintain sealing contact with the annular portion 96 thereby insuring that the increased pressure of the lubricating oil will produce increased sealing contact to prevent the loss of lubricating oil thereby.

A second annular running seal 98 is similar to the first running seal 94 but is mounted on the planetary carrier 30 to make sealing contact with the rearward side of the ring gear wheel 24 throughout relative rotation between the ring gear wheel 24 and the planetary carrier 30. A primary lubricating oil chamber 100 is defined by the running seal 98, the circular disc 32 and the interior sleeve 34 of the planetary carrier 30, the output shaft 16, the interior end 25 of the input shaft 14 and the ring gear wheel 24. At least one bore 101 through the ring gear wheel 24 communicates lubricating oil from the intermediate chamber 92 to the primary chamber 100. Providing lubricating oil to the primary chamber 100 in this manner provides a source of lubricating oil under pressure at a location which allows easy communication of the lubricating oil to the planetary gears and the sun gear.

Specifically, each fixed pin 38 includes an axial bore 102 which communicates the primary chamber 100 with a radial bore 104 therein to provide lubricating oil to the needle bearing 40. Leakage of the lubricating oil from the the needle bearing region insures that lubricating oil is also provided to the thrust washers 42.

One or more bores 106 in the interior sleeve 34 of the planetary carrier 30 provide positive lubrication to the sun gear 46 to insure its free relative rotation about the interior sleeve 34 of the planetary carrier 30. If the sun gear 46 were mounted directly to the output shaft 16 in the manner described hereinabove, a different bore located elsewhere in the planetary carrier 30 could still be employed to direct lubricating oil under pressure to the sun gear 46. An additional pair of radial bores 108 in the sun gear 46 allow lubricating oil to escape from the interior thereof and provide a supply of lubricating oil to the shifting mechanism 52 even through splash lubrication would be expected to generally provide lubrication for this area of the planetary gear reducer 10.

Although there is almost no way to positively determine if the intermediate chamber 92 and the primary chamber 100 remain full of lubricating oil throughout operation of the planetary gear reducer 10, there are indications that they do from the oil pressure level which is generated at the outlet of the pump. A greater resistance to oil flow through the bores 102, 104 and 106 than through the bearings 18 and bore 101 will tend to insure that an increase of the oil pressure at the pump outlet will only occur when the lubricating oil has completely filled the primary chamber 100. As mentioned hereinabove, several types of lubricating oil pumps might be utilized without departing from the invention as claimed. However, the preferred lubricating oil pump 84 is primarily housed between a recess 110 in the housing 12 and a backing plate 112 as shown as shown in FIG. 1. The oil pump 84 is a gerotor type which is well known in the prior art and includes means for providing lubricating oil under pressure at the outlet 88 in both directions of rotation of the input shaft 14.

Figure 3:
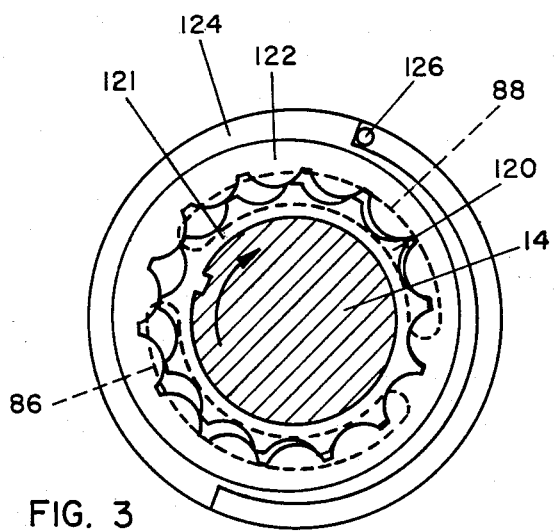
FIG. 3 is an enlarged view of the preferred oil pump as shown in FIG. 1 demonstrating its operation with the input shaft rotating in a first direction.
Figure 4:
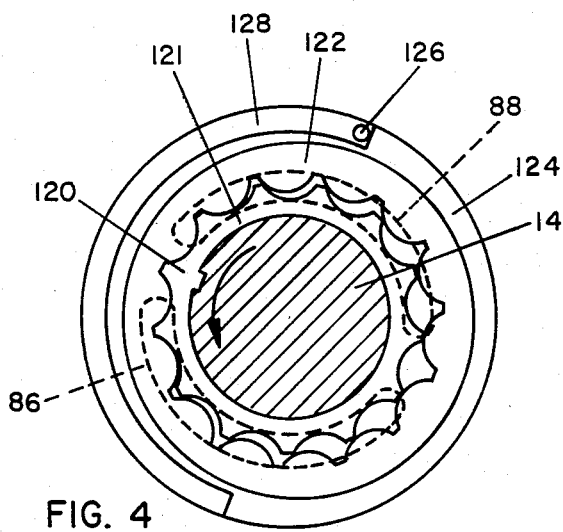
FIG. 4 is a view of the preferred lubricating oil pump shown in FIG. 3 when the input shaft is rotating in the opposite direction.

To better understand the operation of the preferred oil pump 84, FIGS. 3 and 4 demonstrate its operation for both directions of rotation of the input shaft 14. In FIGS. 3 and 4, the pump inlet 86 and the pump outlet 88 are shown with dotted lines although as seen in FIG. 1, it is clear that the preferred configuration includes the inlet 86 at the forward side of the pump and the outlet 88 at the rearward side of the pump. In fact, there is nothing in the operation of the preferred oil pump 84 which would limit the location of either the inlet or the outlet and either might be located on either side of the pump 84 without affecting its overall operation.

The pump 84 primarily includes an inner rotor 120 which is fixedly secured to a collar 121 which is secured to the input shaft 14 for rotation therewith. An outer ring 122 has one more tooth than the inner ring 120 and is mounted for eccentric motion relative thereto to produce a positive displacement pumping action from the inlet 86 to the outlet 88. Specifically, the outer ring 122 is mounted within an eccentric ring 124 which is capable of being reversed to allow for pumping in either direction. A pin 126 through the forward portion of the housing 12 is received within a semi-circular groove 128 in the eccentric ring 124 to allow it to be angularly repositioned by the shaft 14 as its direction of rotation is changed.

The use of other types of pumps might require other alterations in the lubrication system without departing from the invention as claimed. For example, it would even be possible to provide a pump which is radially separated from the input shaft 14 and driven by a gear mounted on the input shaft 14. The outlet of such a pump could be aligned with radial bores in the input shaft 14 which communicate with an axial bore in the input shaft 14. The axial bore could be extended to discharge lubricating oil through the end 25 of the shaft 14 directly into the primary chamber 100 to insure that it includes an adequate supply of pressurized lubricating oil for the more critical elements in the manner described hereinabove. Obviously, such a configuration alone would not insure positive lubrication to the bearings for the input shaft 14 and is, therefore, not the preferred configuration. However, it is clear that if one employed a means for providing lubricating oil directly to the primary chamber 100, the need for the annular running seal 94 and the bores 101 through the worm gear wheel 24 might be eliminated. Such a configuration would still not depart from the invention as claimed.

I claim:

1. An improved lubrication system for a planetary gear system of the type which includes a housing having an input shaft and an output shaft rotatably mounted therein, ring gear wheel means mounted on said input shaft and including a ring gear, a planetary carrier rigidly secured to said output shaft and having a plurality of planetary gears rotatably mounted thereon and in engaging contact with said ring gear, a sun gear engaging said plurality of planetary gears, and means for coupling said sun gear to said housing to cause reduced driving of said output shaft by said input shaft, said improvement comprising:
    a source of lubricating oil in said housing;
    oil pumping means driven by rotation of said input shaft and having an inlet and an outlet;
    first oil passage means for said lubricating oil from said source to said inlet;
    an annular oil tight running seal between said planetary carrier and said ring gear wheel means to define with said planetary carrier, said output shaft and said ring gear wheel means a primary oil chamber;
    second oil passage means for delivering said lubricating oil from said outlet to said primary oil chamber; and
    third oil passage means is said carrier housing to provide said lubricating oil from said primary oil chamber to said plurality of planetary gears.

2. The improved lubrication system as set forth in claim 1, wherein said annular oil tight running seal is secured to a circular disc of said planetary carrier.

3. The improved lubrication system as set forth in claim 1, wherein each of said planetary gears is mounted for rotation about a fixed pin of said planetary carrier and said third oil passage means includes an interior bore means in said pin to provide said lubricating oil for said planetary gear thereon.

4. The improved lubrication system as set forth in claim 1, further including said sun gear being mounted about said output shaft for relative rotation therebetween and fourth oil passage means through said planetary carrier to provide lubricating oil from said primary oil chamber for said sun gear.

5. The improved lubricating system as set forth in claim 1, wherein said input shaft includes bearing means in said second oil passage means, said bearing means being lubricated by said lubricating oil in said second oil passage means.

6. The improved lubrication system as set forth in claim 1, further including an additional annular oil tight running seal between said housing and said ring gear wheel means to define with said input shaft, said housing and said ring gear wheel an intermediate oil chamber as part of said second oil passage means for receiving said lubricating oil from said oil pumping means.

7. The improved lubrication system as set forth in claim 6, wherein said additional annular oil tight running seal is secured to said ring gear wheel means.

8. The improved lubrication system as set forth in claim 6, wherein said second oil passage means includes at least one bore through said ring gear wheel means to allow passage of said lubricating oil from said intermediate oil chamber to said primary oil chamber.

* * * * *